Aug. 14, 1962 B. STEINKEMPER ETAL 3,048,922
APPARATUS FOR DOSING, FORMING AND PACKING OF PLASTIC
FOODS AS BUTTER, MARGARINE AND THE LIKE
Filed April 28, 1960 2 Sheets-Sheet 1
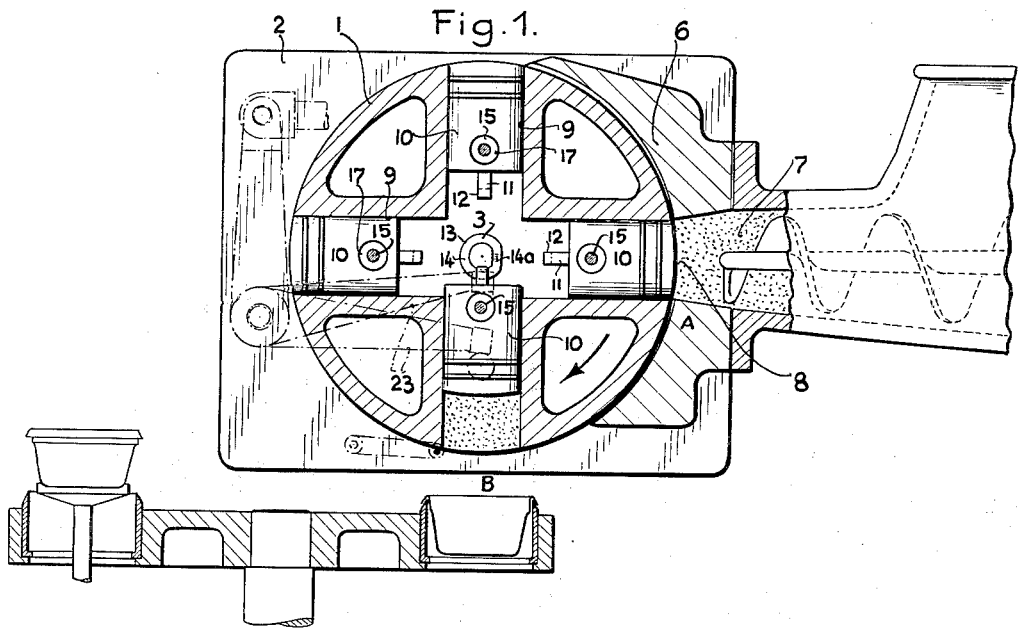
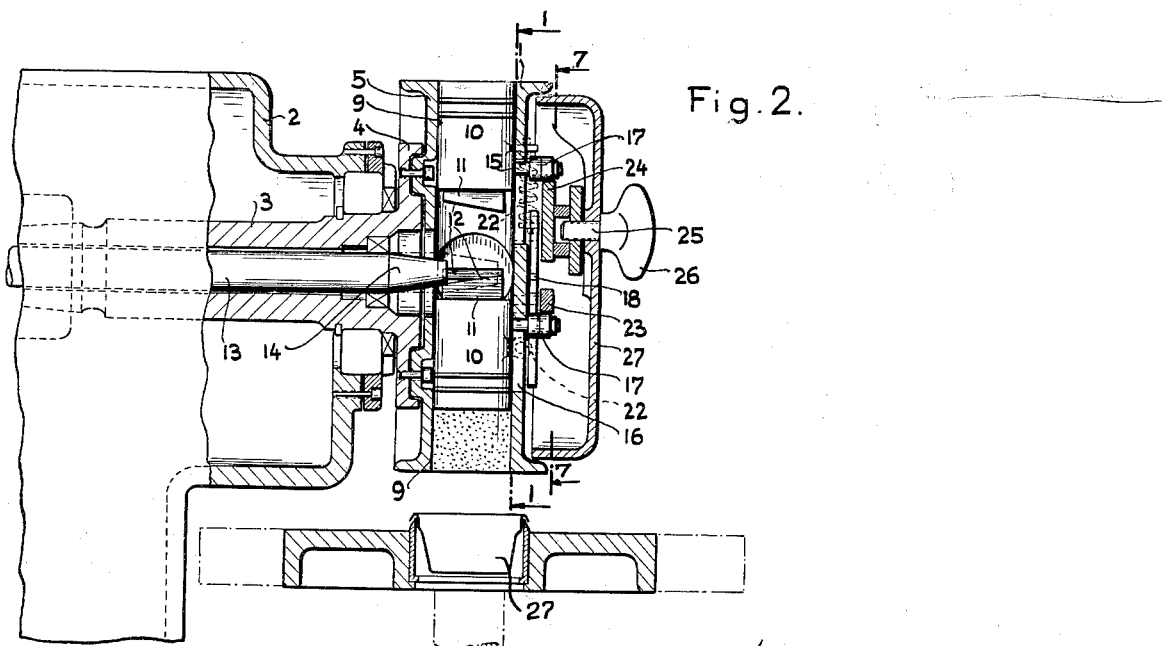

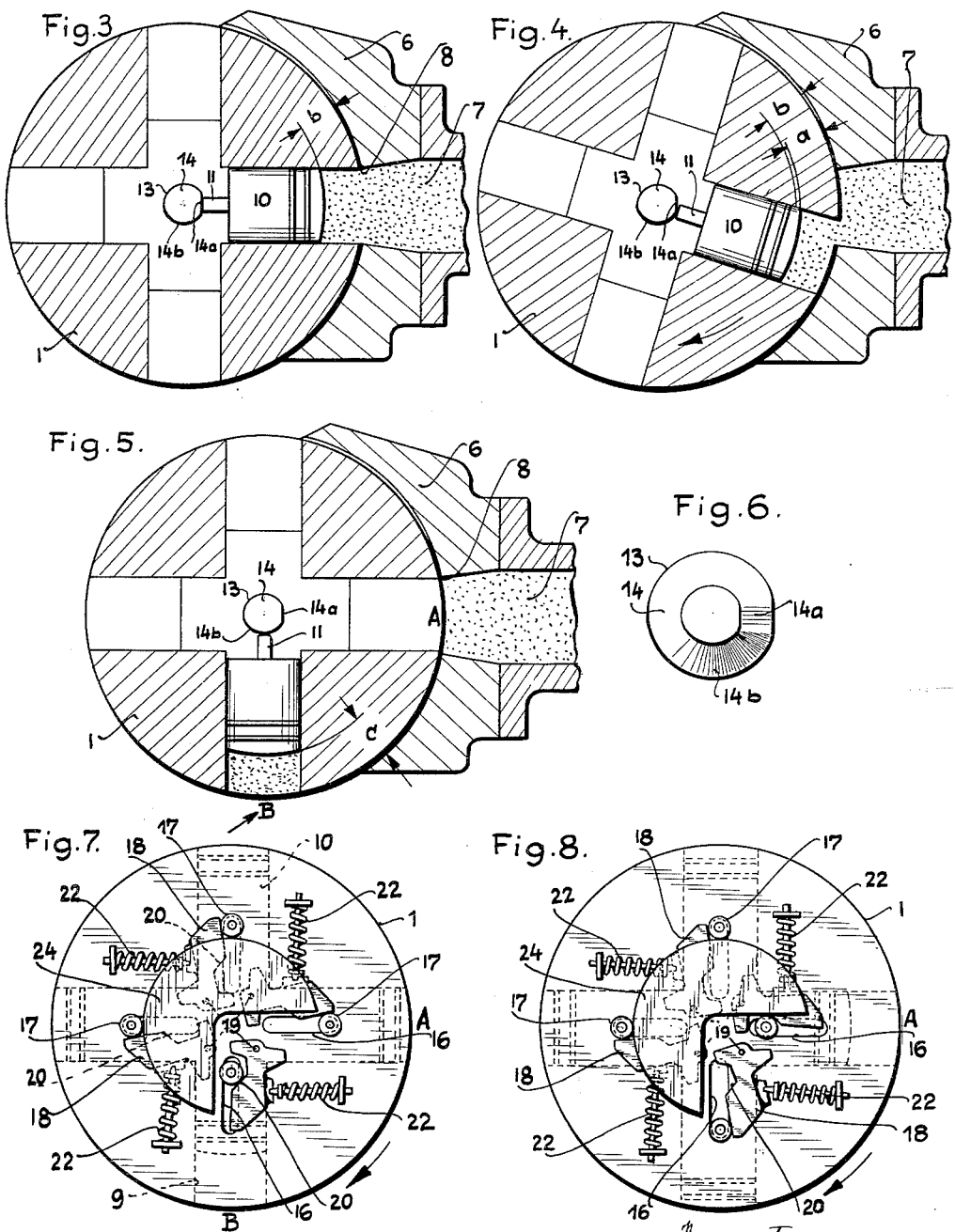

3,048,922
APPARATUS FOR DOSING, FORMING AND PACKING OF PLASTIC FOODS AS BUTTER, MARGARINE AND THE LIKE
Bernhard Steinkemper, Dusseldorf-Unterrath, Franz Weidenhaupt, Dusseldorf-Oberkassel, and Hans Bongartz, Dusseldorf-Unterrath, Germany, assignors to Fa. Benz & Hilders, Maschinenfabrik, Dusseldorf, Germany, a corporation of Germany
Filed Apr. 28, 1960, Ser. No. 25,457
Claims priority, application Germany May 2, 1959
5 Claims. (Cl. 31—44)

The present invention relates to an apparatus for dosing, forming and packing of plastic foods by means of radially disposed pistons which reciprocate in dosing and forming chambers, respectively, of a rotating dosing cylinder. A common abutment member for adjustment of the effective range is provided for the pistons in order to limit the filling stroke and an ejection lever is provided for ejecting the pistons which move inwardly exclusively by the pressure of the material.

In a known dosing device, always the two oppositely disposed pistons of a discontinuously rotating dosing cylinder with four pistons are connected together, so that always one pair of pistons is operated by means of a control operation. The control operation of the pistons is brought about by a lever disposed outside of the dosing cylinder, which, upon pushing in one of the pistons, the other piston is moved out with simultaneous ejection of one unit of the material. Upon a shifting step of 90° of the dosing cylinder, the dosing chamber, the piston of which was previously moved inwardly by pushing in the lever, reaches the filling opening of a feeding conduit from which the plastic material enters speedily into the dosing chamber. It can be easily seen that with this arrangement, no equal weight and form units are assured, since the plastic material, which is pressed from the feeding conduit into a dosing chamber filled with air, can compress the air, yet cannot remove the same. The air pillow created thereby changes with the pressure under which the plastic material is pressed into the dosing chamber. The dosing chamber is thus filled more or less depending on the pressure of the filling material, so that not only differently shaped dosing units, but also appreciable weight differences are experienced with these ejected units.

This appreciable drawback is neither lessened nor removed by a central piston stroke adjustment applied in this device, with which piston stroke adjustment a fine control of the weights is to be brought about. The abutment member used jointly by all pistons in the filled position comprises a half-moon shaped pin, which forms the end of an axis disposed in the center of the dosing cylinder. The portion of the pin shaped as a circular arc is eccentrically arranged in relation to the periphery of the axis, whereby upon slight rotation of the pin, the abutment for the piston is changeable and, thereby, a change of the piston stroke is achieved in the filling position. Since, however, the feeding of the plastic material, as stated above, is subjected to an unequal pressure and for this reason no equal compression of the air pillow takes place, the piston stroke adjustment cannot operate in the direction of an improvement of the exactness of the weight of the dosing units.

A further heavily weighing drawback of the known dosing device resides in the fact that the dosing chamber which is filled with the plastic material on its way into the vertical, downwardly directed ejection position, is not secured against the ejection of the plastic material. If it is further considered that the centrifugal forces occurring during the switching path for an angle of 90°, as well as the gravity force of the plastic material and of the piston support the premature discharge of the plastic material from the dosing chamber and no safety measure is provided in such occurrence, the additional drawbacks and disadvantages of the known device become quite apparent, which reside in the fact that in addition to the weight errors which are caused during dosing by the air pillows, additional weight errors occur due to premature emerging of particles of the material. Due to these occurrences, the machine parts and the packing sheets disposed therebelow are soiled, fatty material of appreciable value is lost, and last but not least the packing units are not exact as to their weight and also as to their outer form unesthetic.

It is, therefore, one object of the present invention to provide an apparatus for dosing, forming and packing of plastic food as butter, margarine and the like, wherein the known drawbacks and disadvantages are not only eliminated, but which provide several advantages of appreciable value.

It is another object of the present invention to provide an apparatus for dosing, forming and packing of plastic foods as butter, margarine and the like, wherein a control device which takes part with the rotating movement of the dosing cylinder is co-ordinated to each of the pistons and with the help of such controlling device, the piston can follow a comparatively changeable and, under certain circumstances, also an irregular abutment face of the central pin by a closed system of mechanical forces.

It is still another object of the present invention to provide an apparatus for dosing, forming and packing of plastic foods as butter, margarine and the like, which includes a controlling device for each of the pistons, which controlling device comprises a plurality of swing-wings identical in number with that of the dosing pistons, and each individual swing-wing controls the piston co-cordnated thereto in the filling position and on its way into the ejection position in the direction towards the central pin.

The particular advantage of such swing-wing resides in the fact that the dosing piston, and thereby the plastic material disposed in the dosing chamber in front of the piston, is pulled into the dosing cylinder against the centrifugal and gravity forces, so that a premature emerging of the material from the dosing chamber is prevented.

A further advantage resides in the fact that the swing-wings partake with the rotating movement of the dosing cylinders. By such arrangement the known control curves with their wear-appearances and with their running noises are eliminated.

Still another advantage resides in the fact that the plastic material is subjected in the dosing chamber to an exact predetermined pressure, furthermore that no air pillows are formed in the dosing chamber, so that the ejected dosing units are characterized not only by exact weights, but also by an exact outer formation.

In addition to the further advantage that the dosing apparatus comprises only a few, easily exchangeable and, therefore, also easily cleanable parts, the present invention provides still a series of other advantages, which will be further set forth below.

With these and other objects in view, which will become apparent in the following detailed description, the present invention will be clearly understood in connection with the accompanying drawing, in which:

FIGURE 1 is an elevational view, the filling device being shown in section along the lines 1—1 of FIG. 2;

FIG. 2 is a longitudinal section of the dosing apparatus;

FIGS. 3 to 5 are fragmentary views of the dosing piston shown in three different working phases;

FIG. 6 is a top plan view of the central pin indicating its conical end face; and FIGS. 7 and 8 are sections of the dosing apparatus along the lines 7—7 of FIG. 2.

Referring now to the drawing, and in particular to

FIGS. 1 and 2, which disclose by example one embodiment of the apparatus for dosing and, under circumstances, for forming of plastic foods, the dosing apparatus comprises a dosing cylinder 1 which is rotatably mounted on a frame 2, the latter also carrying a packing cylinder (not shown). The drive of the dosing cylinder 1 takes place by means of a horizontally mounted hollow shaft 3, one end of which is formed as a flange 4 which is secured to the side wall 5 of the dosing cylinder 1. The peripheral face of the dosing cylinder 1 is surrounded partly by a filling shoe 6 which has a feeding conduit 7 connected with the source of the plastic material. The end of the feeding conduit 7 disposed opposite said dosing cylinder has a filling opening 8.

In accordance with the embodiment selected by example in the drawing, the feeding conduit 7 with its filling opening 8 is disposed in a horizontal plane in relation to the rotating axis of the dosing cylinder 1. The opening cross-section of the filling opening 8 corresponds exactly with the cross-section of the four dosing and forming chambers 9, respectively, disposed in the dosing cylinder 1. A dosing piston 10 reciprocates in each of the four dosing chambers 9. Its working face is accommodated to the peripheral face of the cylinder 1. A wedge-shaped stud 11 projects from the bottom of each piston 10, the conically formed abutment face 12 of the stud 11 co-operating with the conical end 14 of an axially adjustable central pin 13. The central pin 13 has at its conical end 14 a narrow, flat face 14a in relation with the filling position A, which flat face 14a is disposed in axial direction along the end 14 of the central pin 13. In addition, the central pin 13 has also a recess 14b starting a short distance from the flat face 14a and running out in the ejection position B, the base of the recess 14b being of equal level relative to the conical end 14 of the central pin 13 and substantially parallel thereto. An axle 15 is secured laterally to each of the pistons 10, the axle 15 extending through a longitudinal slot 16 provided in one of the side walls of the cylinder 5 and projecting outwardly therefrom, and carrying there the rolls 17. The length of the radially extending longitudinal slot 16 is dimensioned in such a manner that in the outermost position of the rollers 17, the working face of the dosing piston 10 is exactly flush with the peripheral face of the dosing cylinder 1, while the innermost position of the roller 17 in the longitudinal slot 16 provides a piston position, which extends beyond the maximum filling stroke. Swing-wings 18 are provided on the side wall of the dosing cylinder 1 in a number corresponding with the number of the rollers 17 and are swingably mounted upon pins 19. The gravity center of each of the swing-wings 18 is disposed in the center of the shortest distance between two adjacent longitudinal slots 16. Each swing-wing 18 has at its front edge taken in the direction of rotation of the cylinder, two different adjacent guiding faces 20 and 21. The face 20, which is closest to the center of the cylinder and disposed obliquely to the direction of the stroke of the roller, terminates in a trap-like recess between the filling or loading station A and the ejecting station B to control the roller 17 and, thereby, the dosing piston 10. The outer face 21 which is disposed parallel to the direction of the stroke of the roller serves as engagement for the remaining part of the stroke of the roller 17. On the face disposed opposite the guide faces 20 and 21 of the swing-wing 18 is secured one end of a pressure spring 22, the other end of the pressure spring 22 engaging a block mounted on the side wall 5 of the dosing cylinder 1. The ejection movement for the dosing piston 10 is forced by means of a lever 23 operated from the outside of the dosing cylinder 1. Furthermore, a cam disc 24, having the shape of a circular arc, is disposed in front of the swing-wings 18, the roller 17 engaging the cam face during its return stroke from the ejection position B to the filling position A. The cam disc 24 is immovably mounted and releasably secured, by means of a threaded bolt 25 having a wing-head 26, to a cover 27 and serves mainly the purpose to retain the roller 17 and, thereby, the dosing piston 10 in the position, in which the working face of the piston is flush with the peripheral face of the dosing cylinder 1. In this position, the dosing cylinder 1, as shown in FIGS. 1 and 7, runs into the filling position A. The end of the cam disc 24 is for this reason extending as far to the center, as the dosing piston 10 yields only upon being subjected to the pressure of the material pressed into the dosing chamber 9, at the moment when the dosing chamber opening and the filling opening 8 of the feeding conduit 7 are nearly aligned. By this arrangement, really exact filling of the dosing chamber 9 is secured. The roller 17, which engages the outer guide face 21 of the swing-wing 18 up to the filling position A, is moved in the direction towards the center of the dosing cylinder 1 during the return stroke of the dosing piston 10, in which case the roller 17 jumps back into the trap-like recess of the oblique guide face 20. This position is demonstrated in FIG. 8. It can be recognized that the roller 17, due to the pressure exerted by the spring 22, engages only the oblique guide face 20 and thus has the tendency to push the wedge-shaped stud 11 towards the conical end 14 of the central pin 13. Since the pin end 14 has the narrow face 14a in relation with the filling position A, the dosing piston 10 is moved beyond the filling stroke a to perform the stroke b (FIGS. 3 and 4). Accordingly, the dosing chamber 9 has received a volume of material which is larger than the predetermined volume thereof. At the start of the rotating movement of the dosing cylinder 1, yet while it is still within the range of the filling opening 8, the dosing piston 10 moved in the meantime with its stud 11 from the narrow flat face 14a to the full, outer diameter of the end 14 of the central pin 13, and, thus, from the end of the stroke b to the end of the stroke a and the amount of superfluous material is pushed back into the feeding conduit 7 against the pressure exerted by the material.

With this hitherto not applied expedient, such void-less filling of the dosing chamber 9 may be obtained with simultaneous equalized pressure of the dosing units relative to each other, that the afterwards ejected and packed units have an amazing consistency as to their weight and their exact outer formation.

As shown in FIG. 6, the recess 14b starts from the narrow flat face 14a up to the ejection position B. If the dosing piston 10 follows this recess 14b corresponding with the stroke length c (FIG. 5) by means of the oblique guide face 20 engaging the roller 17, the volume of the dosing chamber 10 is increased thereby, without increasing, however, the volume of the material in the dosing chamber 9, since the connection with the feeding conduit 7 is interrupted at the start of the return suction. The material is released of pressure in this manner and it does not cause any forward movement, if the dosing chamber 9 has left with its opening the range of the filling shoe 6. Even in the case of dosing of soft plastic material, the latter remains in the dosing chamber 9 until its ejection can be achieved.

The ejection position B is shown in FIGS. 1, 2 and 5 and, in particular, the forcibly operated lever 23 engages the roller 17 and forces the latter in outward direction along the longitudinal slot 16, until the axle 15 of the roller 17 abuts the end of the longitudinal slot 16. Simultaneously with this movement, the roller 17, engaging the oblique guide face 20, is pressed towards the straight guide face 21 during an escape movement of the swing-wing 18. The dosing piston 10 has moved the total dosing unit in front thereof in outward direction, so that the cutter (not shown) which is quite conventional, separates the dosing unit completely from the working face of the dosing piston 10, which assumed now a position which is flush with the peripheral face of the dosing cylinder 1. The dosing unit is now fed in known manner to a packing container 27 or is wrapped by means of a wrapping sheet.

While the dosing cylinder 1 continues its movement, the lever 23 returns into its original position and remains in such position until it engages the roller 17 of the following dosing piston 10 which is to perform the ejection movement. The roller 17 of the piston 10 which has completed the ejection movement (FIG. 8) is now received by the cam disc 24, which provides that the piston face remains flush with the peripheral face of the dosing cylinder 1 up to the start of a new filling in the dosing chamber, so that the possibility of an undesirable air entrance into the dosing chamber 9 is avoided under all circumstances.

While we have disclosed one embodiment of the present invention, it is to be understood that this embodiment is given by example only and not in a limiting sense, the scope of the present invention being determined by the objects and the claims.

We claim:

1. An apparatus for dosing, forming and packing of plastic foods or the like, comprising a rotating dosing cylinder defining a plurality of radially disposed dosing chambers and having two oppositely disposed cylinder walls, a piston reciprocating in each of said dosing chambers, a wedge-shaped stud projecting radially inwardly from the inner end face of each of said pistons, an axially movable cone disposed coaxially with the rotating axis and in the center of said dosing cylinder, said cone constituting abutment means for said wedge-shaped stud of all of said pistons and adjustable selectively to different abutment positions by its axial movement, each of said pistons moving successively inwardly in the corresponding of said dosing cylinders by force loading, an ejection lever pivoted to one of said cylinder walls and moving outwardly successively each of said pistons in the corresponding of said dosing chambers upon reaching the ejection position, and a control means coordinated to and provided for each of said pistons for forced engagement of said wedge-shaped stud with said central cone effective upon termination of the material loading stroke of said piston to the start of the material ejecting stroke of said piston.

2. The apparatus, as set forth in claim 1, wherein said control means includes a spring-biased swing-wing swingably mounted on and disposed outside of one of said cylinder walls, a roller secured to said roller and moving with and during the strokes of said piston, said roller being adapted to move along the front edge face of said swing-wing taken in the direction of rotation of said dosing cylinder, and said swing-wing includes means controlling the position of said roller and, thereby, of said piston during its travel from its material loading position to its material ejecting position.

3. The apparatus, as set forth in claim 2, wherein said means controlling the position of said roller comprises two adjacent faces disposed on said front edge face of said swing-wing, one of said faces is closer to the center of said dosing cylinder and is inclined towards the direction of the stroke of said roller to terminate in a lock creating recess of said swing-wing, a spring urging said swing-wing towards said roller along said inclined face and simultaneously pressing said roller radially inwardly and, thereby, said wedge-shaped stud of said piston toward said cone, the other of said faces is disposed parallel to the stroke direction of said roller, a cam disc nonrotatably disposed in a plane perpendicularly to the rotating axis of said dosing cylinder and coinciding with the plane in which said roller moves, and said cam disc jointly with said other of said faces retaining said roller and thereby, said piston in the outermost position of the corresponding of said dosing chambers.

4. The apparatus, as set forth in claim 2, wherein one of said cylinder walls has a plurality of slots equal in number with that of said pistons and disposed parallel to the stroke direction of the corresponding of said pistons, an axle projecting laterally through each of said slots from the corresponding of said pistons, said axle carries said roller outside of one of said cylinder walls, and said slots constituting stroke limiting means for said rollers and, thereby of said pistons.

5. The apparatus, as set forth in claim 1, wherein said cone has a flattened portion at its inner end within the range of said material loading position to permit a further radial inward movement of said wedge-shaped stud of said pistons toward said flattened portion of said cone, said flattened portion reducing the radius of said cone and, thereby, increasing the piston stroke inwardly during the loading stroke of said piston in said position, and said cone has at its inner end a recess starting outside of and upon leaving the effective range of said material loading position and terminating in and appoints to the material ejection position of said dosing cylinder and said recess is angularly displaced ahead of said flattened portion of said cone in the direction of rotation of said dosing cylinder, whereby the pressure on said material in said dosing chamber is partly released prior to and upon reaching said material ejecting position.

References Cited in the file of this patent

UNITED STATES PATENTS

| | | |
|---|---|---|
| 709,793 | McGinnity | Sept. 23, 1902 |
| 752,644 | Benson et al. | Feb. 23, 1904 |
| 1,088,532 | Callow | Feb. 24, 1914 |
| 1,788,330 | Ross | Jan. 6, 1931 |
| 1,954,501 | Steere | Apr. 10, 1934 |
| 2,754,773 | Froidevaux | July 17, 1956 |